UNITED STATES PATENT OFFICE.

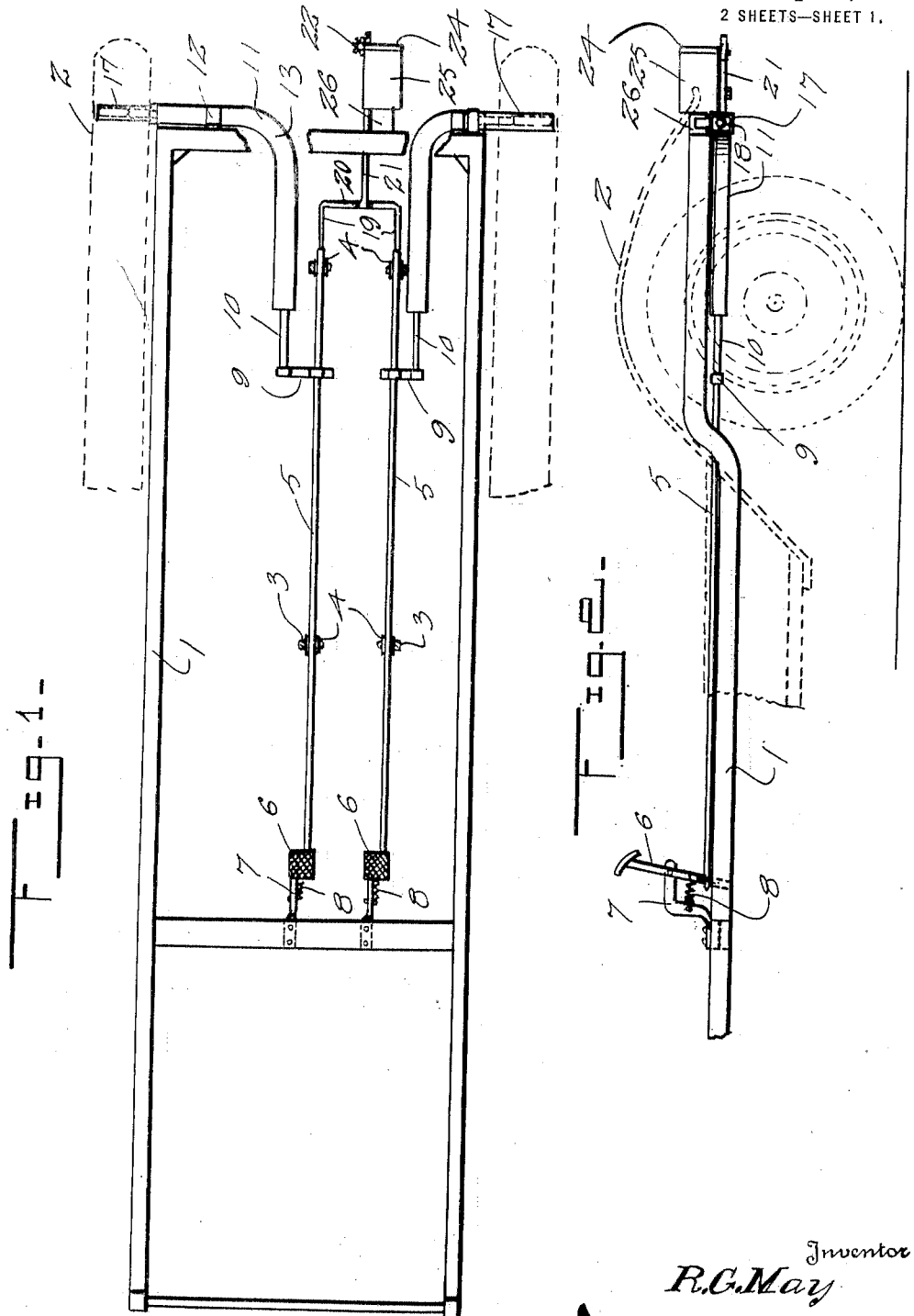

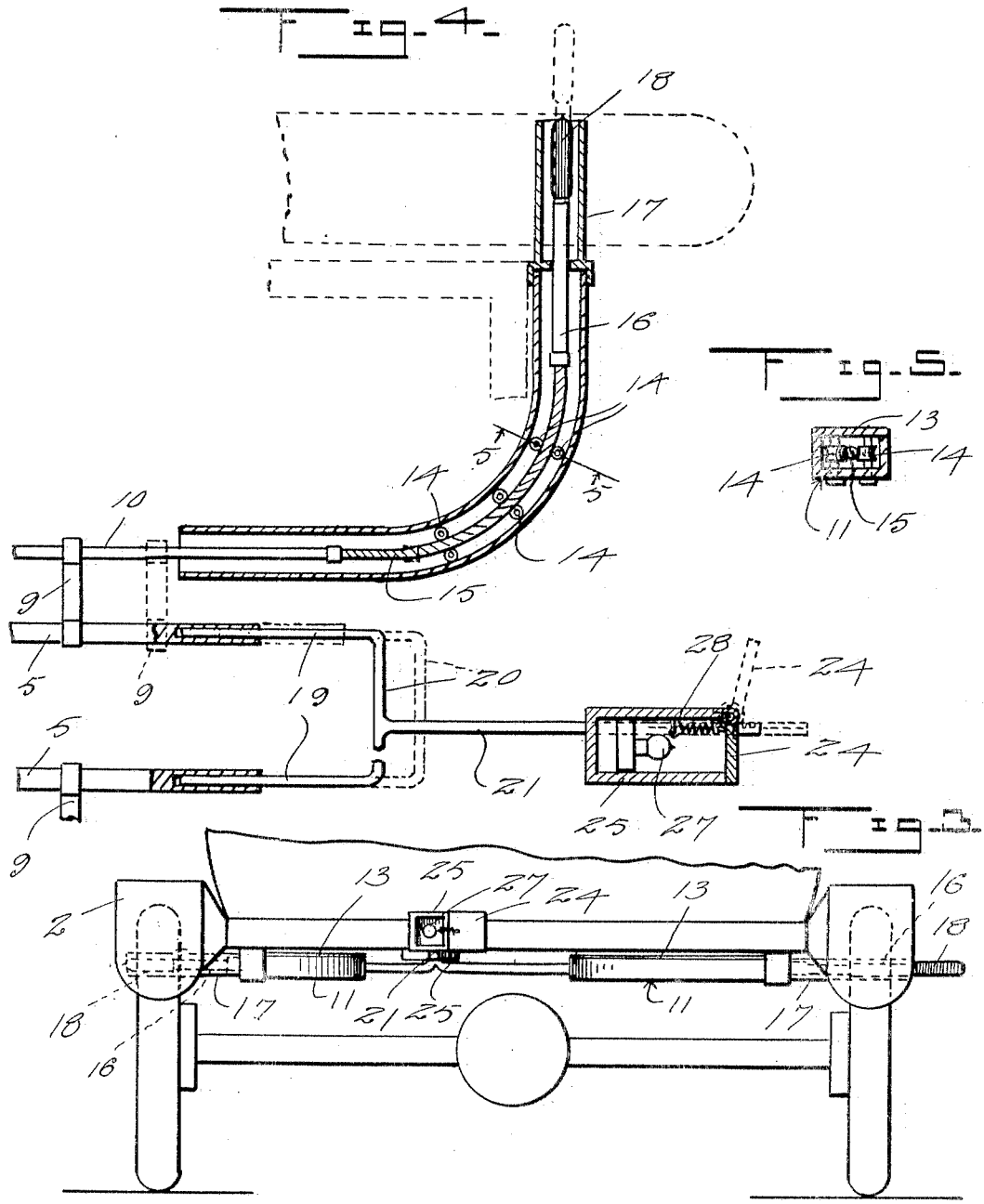

ROBERT G. MAY, OF LOUISVILLE, KENTUCKY.

AUTOMOBILE DIRECTION-INDICATOR.

1,315,850.     Specification of Letters Patent.     Patented Sept. 9, 1919.

Application filed October 3, 1917. Serial No. 194,530.

*To all whom it may concern:*

Be it known that I, ROBERT G. MAY, a citizen of the United States, residing at Louisville, in the county of Jefferson and State of Kentucky, have invented certain new and useful Improvements in Automobile Direction-Indicators; and I do hereby declare the following to be a full, clear, and exact description of the invention, such as will enable others skilled in the art to which it appertains to make and use the same.

This invention relates to improvements in automobile direction indicators and has for one of its objects, the provision of a device of this character whereby the direction in which the automobile is to be turned may be readily indicated.

Another object of this invention is the provision of means adapted to attract the attention of traffic upon actuating either the signaling means that indicates in which direction a turn is to be made.

A further object of this invention is the provision of an automobile direction indicator of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a top plan view of a direction indicator constructed in accordance with my invention, Fig. 2 is a side elevation of the same, Fig. 3 is a rear elevation illustrating one of the signaling means in signaling position and the attention attracting means operating, Fig. 4 is a fragmentary longitudinal sectional view illustrating the means of actuating the signaling means and the attention attracting means, and Fig. 5 is a transverse sectional view taken on the line 5—5 of Fig. 4.

Referring in detail to the drawings, the numeral 1 indicates the chassis of an automobile having secured to the rear end thereof the ordinary rear mud guards 2. The foregoing description relates to a well known construction of automobile, and to which my invention is applied.

The chassis 1 has secured thereto pairs of brackets 3 to which are journaled rollers 4 for the purpose of slidably supporting actuating rods 5. The rods 5 extend longitudinally of the chassis 1 and have their forward ends connected to foot pedals 6. The foot pedals 6 are pivoted to brackets 7 carried by the forward end of the chassis 1 so as to position the foot pedals in convenient reach of the operator of the automobile. The foot pedals are normally held in operative position by means of springs 8 which are connected thereto and to the brackets 7. The springs 8 will permit the pedals 6 to be pushed forwardly by the operator to actuate the device but will be automatically returned to their normal position immediately upon being released by the operator.

Suitable clamps 9 are secured to the operating rods 5 adjacent their rear ends and have connected thereto, rods 10 that extend into housings 11 of substantially L-shaped formation and which are supported to the rear end of the chassis 1 by brackets or hangers 12. The housings 11 are of rectangular formation having the top walls 13 removable so that friction reducing rollers 14 may be placed and removed therefrom when desired.

Flexible shafts 15 are connected to the ends of the rods 10 and extend between the friction reducing rollers and have connected to their free ends arms 16. The arms 16 are slidable in suitable casings 17 that are detachably connected to the ends of the housings 11 and disposed under the rear mud guards 2. The casings 17 have their outer ends open so that elongated electric lamps 18 carried by the arms 16 may slide inwardly and outwardly thereof. When the electric lamps 18 are disposed outwardly of the casings 17 and laterally of the mud guards 2, they are in clear view of the traffic so that the traffic will be informed in which direction a turn is contemplated by pressing upon either of the foot pedals 6. By pressing upon one of the foot pedals 6, the respective electric lamp 18 connected thereto will be moved laterally of the mud guards indicating that a turn is to be made in that direction.

The rear ends of the operating rods 5 are of hollow formation for the purpose of slidably receiving the arm portions 19 of a substantially U-shaped member 20. The substantially U-shaped member 20 has formed upon its web portion a rod 21 which extends rearwardly of the rear end of the chassis 1 and has formed thereon rack teeth for engagement with a pinion 22. The pinion 22 is secured to a pintle 23 forming a hinge for a door 24 on a housing or casing 25 that is secured to the rear end of the chassis 1 by a bracket 26. Positioned within the casing or housing 25 is an electric lamp 27, the door 24 being normally closed when the device is not operating by the influence of the spring 28. Upon operating either of the foot pedals 6 to actuate the signaling lamps 18 to signaling position, the substantially U-shaped member is moved rearwardly causing the rod 21 to rotate the pinion which swings the door 24 to an open position as illustrated in dotted lines in Fig. 4 so that the attention of the traffic will be attracted by the electric lamp 27 indicating substantially in advance to them that one of the signaling means disposed laterally of the automobile is moving to a signaling position.

The electric lamps 18 and 27 may be connected in any ordinary manner to an electrical source not shown for the purpose of illuminating the same.

While I have shown and described the preferred embodiment of my invention, it will be understood that minor changes in construction, combination and arrangement of parts may be made without departing from the spirit and scope of the invention as claimed.

What is claimed is:—

1. A direction indicator comprising signal lamps carried by an automobile, means moving the signal lamps laterally of the automobile, and a preliminary signal attracting attention to the signal lamps upon moving into signaling position.

2. A direction indicator for automobiles comprising signal lamps carried by the automobile, means moving said signal lamps laterally of the automobile, and a preliminary signal for attracting the attention of traffic actuated by said means when operated to move the signaling lamps laterally of the automobile.

3. A direction indicator comprising housings secured to an automobile, casings carried by said housings and disposed laterally of the automobile, electric lamps slidable in said casings, flexible shafts extending through the housings and connected to the electric lamps, means connected to the flexible shafts for moving the electric lamps outwardly of the casings and laterally of the automobile and a preliminary signal controlled by said means.

4. A direction indicator comprising operating rods slidably mounted upon an automobile, foot pedals connected to the operating rods, flexible shafts connected to said operating rods, sectional housings secured to the automobile and slidably supporting the flexible shafts, casings carried by said housings, electric lamps slidable in said casings and connected to the flexible shafts, and attention attracting means carried by the automobile and actuated by the operating rods.

5. A direction indicator comprising operating rods, means actuating the operating rods, electric lamps operatively connected to the operating rods and adapted to be moved laterally of the automobile, a housing carried by the automobile, electric lamps in said housing, a spring actuated door closing said housing, a substantially U-shaped member slidably connected to the operating rods, a rod formed on said substantially U-shaped member and having teeth thereon, and a pinion in mesh with said teeth and connected to the door for swinging said door into an open position upon operation of the operating rods.

6. A direction indicator comprising transversely extending casings secured to an automobile and having their outer ends fully open, signaling means slidably mounted in the casings and normally concealed therein, means moving said signaling means outwardly of the casings and laterally of each side of the automobile, and attention attracting means carried by the automobile between said casings and adapted to be operated by said operating means prior to the signaling means exiting from the casings.

In testimony whereof I affix my signature in presence of two witnesses.

ROBERT G. MAY.

Witnesses:
   J. E. JOHNSON,
   WILLIAM JONES.